ns Patent [19]

Farhadieh

[11] 3,922,379
[45] Nov. 25, 1975

[54] MICROENCAPSULATION PROCESS
[75] Inventor: Bahram Farhadieh, Libertyville, Ill.
[73] Assignee: Abbott Laboratories, North Chicago, Ill.
[22] Filed: Dec. 17, 1973
[21] Appl. No.: 425,456

[52] U.S. Cl. .................. 427/3; 424/36; 428/407
[51] Int. Cl.² ............................................ A61K 9/38
[58] Field of Search .......... 117/100 A, 164; 424/36; 427/3; 428/407

[56] References Cited
UNITED STATES PATENTS

| | | | |
|---|---|---|---|
| 2,739,167 | 3/1956 | Conn | 117/100 A |
| 2,800,457 | 7/1957 | Green et al. | 117/164 |
| 2,937,091 | 5/1960 | Rosenberg | 424/36 |
| 3,041,288 | 6/1962 | Anthony | 117/164 |
| 3,401,123 | 9/1968 | Brynko et al. | 117/100 A |
| 3,406,119 | 10/1968 | Kosar et al. | 117/100 A |
| 3,558,594 | 1/1971 | Jones et al. | 260/210 E |
| 3,565,559 | 2/1971 | Sato et al. | 117/100 A |
| 3,656,997 | 4/1972 | Cordes | 117/100 A |
| 3,753,922 | 8/1973 | Shimosaka et al. | 117/100 A |

*Primary Examiner*—Michael Sofocleous
*Assistant Examiner*—Dennis C. Konopacki
*Attorney, Agent, or Firm*—Paul D. Burgauer; Robert L. Niblack

[57] ABSTRACT

The process of the present invention is designed to protect particles of substantially water-insoluble, pharmaceutically active, erythromycin derivatives from being inactivated by the acids of the stomach and simultaneously to cover their objectionable taste. Small particles of the drug are encapsulated in a water-soluble albumin which is then coagulated to form a protective water-insoluble coating essentially around each of the drug particles. The new particles are particularly suitable for processing into chewable tablets, suspensions, syrups or other dosage unit forms for oral administration.

6 Claims, No Drawings

MICROENCAPSULATION PROCESS

DETAILED DESCRIPTION OF THE INVENTION

Erythromycin salts and esters such as the alkylsulfate salts or the monoalkyl erythromycin esters of dicarboxylic acids, e.g., the erythromycin ethyl succinate have been known for a number of years and have enjoyed excellent acceptance due to their wide spectrum of antibacterial activity. Unfortunately, some of these esters and/or salts have a number of physical and chemical properties which are objectionable for administration in the form of liquid suspensions. For instance, erythromycin ethyl succinate has a bitter taste which is very difficult to mask and even worse, it is known that when exposed to an acidic environment, it eventually converts to an anhydro form which is inactive. Since the stomach of warm-blooded animals represents a strongly acidic environment, it is not surprising to find that unprotected erythromycin ethyl succinate loses part of its activity after ingestion.

For the above reason, various methods have been devised to prevent exposure of the active erythromycin derivatives from being exposed to the taste buds and/or from the inactivating effect of the acidic environment in the stomach. A popular method consists in coating the tablets containing such a drug. However, this is unsuitable when a liquid preparation or a chewable tablet with erythromycin derivatives is desired. Such a liquid or tablet would require a variety of flavoring additives and several preparative steps would be required to mask the extremely bitter taste of such erythromycin esters or salts.

It is therefore an object of the present invention to prepare a substantially tasteless medicinal preparation for erythromycin derivatives. It is a specific object of the present invention to provide a method for preparing a liquid dosage form for medicinally active erythromycin esters or salts suitable for oral administration. It is still a further object of the present invention to prepare a liquid formulation for erythromycin esters or salts which provides excellent stability of the active ingredient in an acid environment. It is still another object to provide simple particles suitable for making a chewable tablet of a medicinally active erythromycin derivative. It is a particular object of the present invention to provide a method for making pharmaceutical dosage forms for erythromycin derivatives which have acceptable taste for oral ingestion.

These and other objects are accomplished by the process of microencapsulating an orally active erythromycin derivative consisting essentially in suspending particles of said erythromycin derivatives of 10 – 150 microns in diameter in water adjusted to a pH of above 7.0 containing or dissolving therein a water-soluble albumin, said albumin being heat-coagulable at a temperature of 50° – 80° C., and being present at a weight ratio between 1:2 and 2:1 to said erythromycin derivative, stirring said suspension into a liquid alkane containing 1 –10% by weight of a nonionic surfactant, emulsifying the dispersion, heating said emulsion under stirring for a period sufficient to coagulate said albumin and collecting the solid from said suspension.

In the simplest embodiment, the pH of the aqueous phase is adjusted by the addition of sodium hydroxide but any other water-soluble base may be used, preferably a nontoxic base. The albumin can usually be coagulated within 10 minutes at a temperature of 65 – 75° C., but longer periods at 50° C. or shorter periods at 80° C. may be suitable, depending on the nature of the albumin.

The above erythromycin particles of 10 – 150 microns diameter are easily available by proper milling of the desired crystalline erythromycin derivative. However, while particle sizes of 10 – 150 microns are preferred, particles slightly below or slightly above this range may accompany the particles of this range to an extent of up to 5 or 8%.

An excellent source of a water-soluble albumin is egg albumin which is water-soluble and is easily coagulated at a temperature of 72° – 78° C. whereby it becomes partially denatured and thus water-insoluble. The aqueous solution in which said albumin is dissolved has to be adjusted to a pH above 7.0 to assure that said erythromycin derivative does not dissolve in the aqueous albumin solution. The preferred pH range is between 7.5 and 8.5 although the range of 7.1 – 10.0 can be used without adverse effect on yield or efficiency of the procedure.

Among the nonionic surfactants, a sorbitan trioleate (for instance Span 85) is preferred but other wetting agents having a similar hydrophile-lipophile balance of about $1.8 \pm 0.3$ are equally suitable, provided that they are soluble in the selected liquid alkane, e.g., the surfactants sold under the trade name of Arlacel 85 (also a sorbitan trioleate) and other agents that provide the above phase distribution.

The ratio between the above erythromycin derivatives and albumin can be changed within a rather wide range. Ratios between 2:1 and 1:2 produce suitable blood levels of the erythromycin ester. Changes within these ratios will alter the activity per unit weight of the final microencapsulated product as well as the thickness of the coated albumin shell but suitable microcapsules can be prepared within the entire ratio.

The size of the microcapsules is primarily affected by the size of the drug particles and the ratio between drug and albumin; it can further be controlled by the extent of applied agitation. Starting with drug particles of 10 – 50 microns diameter, agitation at 1500 – 2500 rpm produces microcapsules ranging from 50 – 80 microns in diameter, depending on the ratio of albumin to drug. Obviously, lower agitation speeds and higher levels of albumin will yield larger particles and vice versa.

The heating range of 50° – 80° C. depends somewhat on the nature of the albumin used. The upper limit is dictated by the extent of increased solubility of said erythromycin derivative in the organic, water-immiscible medium; for instance, when isooctane, erythromycin ethyl succinate and egg albumin are used, an excellent temperature range is between 72° and 78° C. since this will not increase the solubility of the drug in isooctane appreciably and provides for coagulation of the albumin within 10 minutes.

The liquid alkanes that are used in the preparation of the microcapsule of the present invention are noncoagulants for albumin; they also are nonsolvents for the above erythromycin esters, even at temperatures beyond 80° C. Most suitable representatives are isooctane, n-heptane, n-octane and n-nonane but other similar materials or mixtures selected from within this group of liquids and preferably alkanes having a density of between 0.7 and 1.0 g./ml. at 25° C. can be used. This additional qualification assures a stable dispersion while the drug particles remain intact.

The albumin used for the process of the present invention must be water-soluble and must be heat coagulable, preferably at a temperature of between 50° and 80° C. An excellent and inexpensive representative of this group is egg albumin which is easily coagulated at 74° C. in 10 minutes, but other proteins such as blood plasma, globulin, myosin, glutelin, exelesin, edestin, arachin, casein and mixtures thereof can be used with equally good results.

In order to demonstrate the process of the present invention, reference is made to the following example, which however, is not intended to limit the invention in any respect.

EXAMPLE I

A solution of 11.25 g. of egg albumin in 75 ml. of distilled water is prepared and its pH is adjusted to 8.0 by adding a few drops of sodium hydroxide. Next, 11.25 g. of erythromycin ethyl succinate (840 micrograms/mg.) is dispersed in this solution. This dispersed is added to 500 ml. of isooctane containing 25 g. of Span 85 (sorbitan trioleate manufactured and distributed by Atlas Chemical Co.). The mixture is stirred at 2000 rpm in order to emulsify the dispersion in the isooctane. After all of the dispersion has been added, the emulsion is stirred for 2 minutes and subsequently, the stirring speed is reduced to 1000 rpm and the flask is placed for 10 minutes in a water bath of 74° C. which coagulates the egg albumin around the erythromycin ethyl succinate crystals. The mixture is then cooled to room temperature and the liquid is decanted. The remaining solids are then washed with two 100-ml. portions of a 2% aqueous solution of Tween 20 (a polyethylene sorbitan mono-laureate, marketed by Atlas Chemical Co.) and after each wash, the solids are separated by centrifugation. This washing procedure is repeated with four 200-ml. portions of water and the remaining solids are converted by freeze-drying to a free-flowing powder. Analysis of the microcapsules of this example by gas chromatography shows that the isooctane content of the product is <0.03%.

The particle size range of the above made product is between 50 – 80 microns and the erythromycin ethyl succinate content of the product is very close to the theoretical value of 500 mg./g. as established by automated turbidometric assay technique.

The microencapsulated product made in this fashion shows an acute oral $LD_{50}$ in rats of >10 g./kg. indicating that the product is as safe as the untreated erythromycin ethyl succinate.

In order to show efficacy and activity of the microencapsulated erythromycin ethyl succinate, the above microcapsules were tested in vivo in monkeys. The blood levels attained with the above microcapsules were compared with blood levels attained with erythromycin ethyl succinate (Ery. ES) without encapsulation. Each group of animals consisted of 4 monkeys weighing between 1.8 and 2.6 kg. each. In all tests, the active ingredient was suspended in water and each animal was fasted 24 hours before being orally administered 30 mg./kg. of the drug. Blood serum levels for each animal were tested at the beginning of the experiment (0 hour) and 1, 2, 3 and 4 hours following drug administration. The serum levels were determined by disc assay and the results are shown below in Table I as measured in μg./ml. of blood serum.

TABLE I

| Serum Levels | 0 hour | 1 hour | 2 hours | 3 hours | 4 hours |
|---|---|---|---|---|---|
| Ery ES 30 mg./kg. | <0.030 | 0.227 | 0.064 | <0.030 | <0.030 |
|  | <0.030 | <0.030 | <0.030 | <0.030 | <0.030 |
|  | <0.030 | 0.124 | 0.045 | <0.030 | <0.030 |
|  | <0.030 | <0.030 | 0.051 | <0.030 | <0.030 |
| Ery ES/ albumin 30 mg./kg. | <0.030 | 0.085 | 0.066 | <0.030 | −0.030 |
|  | <0.030 | 0.127 | 0.128 | 0.057 | 0.041 |
|  | <0.030 | 0.074 | 0.087 | 0.040 | <0.030 |
|  | <0.030 | 0.037 | 0.051 | <0.030 | <0.030 |

Blood level variations within the same group of animals are not unexpected with any kind of erythromycin administration and will be apparent from each individual group of four animals at all levels. However, the table shows that the microencapsulated drug particles provide essentially the same or better bioavailability as the nonencapsulated drug particles administered in the same fashion and dose level.

While the blood levels between the known dosage form and that of the new composition are comparable and certainly show no deficiency of the new microcapsules, the latter is superior in other aspects. It has excellent stability due to the substantial elimination of exposure of the drug particles to the environment. Of more immediate concern is the fact that the microencapsulated drug is essentially tasteless: through actual taste-panel evaluations it was established that the new drug particles have initially no taste and that after allowing the product to remain in the buccal cavity for 30 – 60 seconds, only a very slight level of bitterness is noticed.

Bioavailability of the product of this invention was also tested in vitro by a leaching test in media at 5.5, 6.5 and 7.5 attained with phosphate buffer and kept at 37° C. The results are shown in Table II below wherein the release values obtained are expressed in percent release of the total amount of erythromycin ethyl succinate present in the microencapsulated product.

TABLE II

| | Percent of total drug content released at | | |
|---|---|---|---|
| Time | pH 5.5 | pH 6.5 | pH 7.5 |
| 1 hour | 41.10 | 14.1 | 9.7 |
| 2 hours | 83.80 | 20.7 | 15.5 |
| 3 hours | 98.70 | 28.9 | 27.4 |
| 7 hours | 101.10 | 42.2 | 41.1 |

The above table shows that the active drug is available biologically throughout the range of pH tested. The fact that the drug leaches out of the microcapsules slower at pH 6.5 and 7.5 than at 5.5 is of little consequence as the pH of the stomach is always heavily on the acid side. In addition, an in vivo system includes albumin-degrading enzymes which aid in the exposure of the active drug from the albumin covered microcapsules.

Ten normal adult male subjects were used in a blood level study. The subjects were fasted for a minimum of 12 hours prior to the test. An aqueous suspension of the above microcapsules was prepared and a dose equivalent to 400 mg. erythromycin was given orally to each subject. Blood was withdrawn at zero time and at regular intervals after administration for a total of 8 hours. Blood samples were assayed for erythromycin activity by the disc plate method. The mean erythromycin blood levels are given in Table III.

In separate experiments, powdered, crystalline erythromycin ethyl succinate was given orally as an aqueous suspension at a 400 mg. dose level to a total of 81 human subjects; the average erythromycin blood levels so obtained are shown as "Control" in Table III.

TABLE III

Mean Erythromycin Blood Levels (mcg./ml.)
After Ingestion of Microencapsulated Drug & Control

| Hour | Microcapsules | Control |
|---|---|---|
| 0 | 0.00 | 0.00 |
| 0.5 | 1.16 | |
| 1 | 0.96 | 0.91 |
| 2 | 0.46 | 0.38 |
| 3 | 0.28 | |
| 4.5 | 0.15 | 0.13 |
| 6 | 0.10 | 0.08 |
| 8 | 0.09 | |

The data presented in TAble III indicates that the bioavailability of the drug from the microencapsulated erythromycin ethyl succinate is equivalent to that of the nonmicroencapsulated drug.

EXAMPLE II

In a modification of the process shown in Example I, 22.50 g. of erythromycin cetyl sulfate is used in place of the erythromycin ethyl succinate used before, and only 5 g. of Span 85 was used as a surfactant. The freeze-dried powder obtained according to the above work-up assayed 414 mg. of erythromycin cetyl sulfate per gram of the product.

A weighed quantity of the microencapsulated drug was dispersed in the particular release medium shown below. The media were kept at 37° C. and constantly stirred throughout the test. Samples were taken at given times and assayed by the arsenomolybdate method. The media were:
 a. Simulated gastric fluid, pH 1.2, without pepsin
 b. Aqueous phosphate buffer, pH 5.0
 c. Aqueous phosphate buffer, pH 6.0
 d. Simulated intestinal fluid, pH 7.5, without pancreatin The release data shown in Table IV and expressed in % of total drug content released demonstrates that the erythromycin cetyl sulfate diffuses from the microcapsule and that the release rate depends on the pH.

TABLE IV

| Time/ Minutes | Percent of Total Drug Content Released in Medium | | | |
|---|---|---|---|---|
| | a | b | c | d |
| 30 | 83 | 24 | 20 | 24 |
| 60 | 92 | 34 | 26 | 30 |
| 120 | 93 | 49 | 31 | 37 |
| 180 | | 52 | 34 | 42 |
| 240 | | 58 | 37 | 45 |

While the above example and tests were carried out with erythromycin ethyl succinate and erythromycin cetyl sulfate, other orally active, substantially water-insoluble esters or salts show similar release patterns in vivo and in vitro. Particularly suitable for microencapsulation according to the present invention are the erythromycin salts of the type described in U.S. Pat. No. 3,558,594 and the erythromycin esters of the formula:

$$Ery-OOC-(CH_2)_nR$$

wherein n is an integer from 1 to 20 and R is hydrogen or $-COOR'$ with $R'$ representing loweralkyl. In all instances, the stability of the drug is considerably enhanced as the microcapsules obtained by the process of this invention are not exposed directly to the effect of the environment. This has always been of particular concern because of the known instability of most biologically active erythromycin derivatives in water and, particularly, in acids. Furthermore, the bitter taste of the poplar erythromycin esters and salts is removed almost entirely which allows the preparation of liquid dosage forms previously available only after considerable efforts in taste masking. The new particles are thus particularly well suited for the preparation of oral unit dosage forms for oral administration. They can easily be processed into chewable tablets, syrups, suspensions, capsules and the like. The microencapsulated particles of this invention may also be stored as such, preferably in the form of the above-described flowable powder that affords excellent storability.

In order to prepare a unit dose suspension, a simple procedure consists in dry blending the above particles with about 5% by weight of a sodium carboxymethylcellulose of high viscosity and about 250% by weight of sugar. This blend can be stored for extended periods of time, preferably in a sealed, amber container. At the point in time when medication is requested, the blend is suspended in the proper amount of water to produce a dosage unit of about 400 mg. of erythromycin per 10 ml. of suspension which is then highly acceptable for oral administration.

In order to make a chewable tablet, the microencapsulated particles are simply dry-blended with about 1% of magnesium stearate, a dry flavor and about an equal amount of mannitol and this blend is suitable to be directly compressed into tablets of suitable size and activity.

In order to obtain a satisfactory product with the above drug particles, it is important that the manufacturing liquid to which the mixture of drug and albumin is added contains at least 1% by weight of a nonionic surfactant that has a hydrophile-lipophile co-efficient of about $1.8 \pm 0.3$. It is perfectly permissible to use a surfactant that has a coefficient of 1.5, but in that case, a somewhat larger amount should be employed. If the above coefficient is 2.1, satisfactory results are obtained with only 1% thereof in the liquid alkane. Of course, amounts of above 10% by weight of the surfactant in the alkane can be employed in the manufacturing liquid but since this tends to increase the cost of this liquid without added benefit, the best suited range is between 1 and 10% of the surfactant.

The described new process represents a unique advantage over any other encapsulating methods because the active ingredient is exposed to the stability deteriorating effect of an aqueous medium only for a short time and allows for the adjustment of its pH to a much less damaging level during this processing period. No acidic environment is used at any time during this process and since the above drugs are essentially insoluble in aqueous media at a pH of >7.0, their antibiotic activity remains intact throughout the process.

The particles encapsulated by the present process present an extremely valuable and versatile feature: they can be used for the manufacturing of liquid suspensions wherein they remain stable and retain their initial antibiotic activity. They can be processed into chewable tablets or, if desired, into standard tablets that require no coating for the purpose of taste masking. For this reason, the microcapsule represent an ideal vehicle for a universally useful stock of erythromycin derivatives which can be stored safely for extended periods of time and can be processed into any kind of an oral dosage form at a point in time when the selection of type of product, tablets, wafers, pills, chewables, suspensions, etc., has been made.

What is claimed is:

1. The process of preparing essentially tasteless particles of an orally active derivative of erythromycin, consisting essentially in suspending particles of 10 – 150 microns diameter of said erythromycin derivative in water adjusted to a pH above 7.0, containing or dissolving therein a water-soluble protein, which is heat coagulable at a temperature between 50° and 80° C., stirring said suspension into a liquid alkane containing 1 – 10% by weight of a nonionic surfactant, emulsifying the mixture, heating said mixture under stirring for a period sufficient to coagulate said heat coagulable protein, and collecting the coated particles solid from said suspension.

2. The process of claim 1 wherein said liquid alkane is isooctane.

3. The process of claim 1 wherein said protein is egg albumin.

4. The process of claim 1 wherein said pH is between 7.5 and 8.5.

5. The process of claim 1 wherein said surfactant is a sorbitan trioleate.

6. The process of claim 1 wherein said albumin and said erythromycin derivative are present in a weight ratio of between 1:2 and 2:1.

* * * * *